United States Patent [19]

Kuwae et al.

[11] Patent Number: 5,457,599
[45] Date of Patent: * Oct. 10, 1995

[54] ELECTROLYTE FOR ELECTROLYTIC CAPACITORS AND ELECTROLYTIC CAPACITOR USING THE ELECTROLYTE

[75] Inventors: Yoshiteru Kuwae; Katsuji Shiono; Takaaki Kishi, all of Kyoto; Hideki Shimamoto, Osaka; Hisao Nagara, Kyoto; Keiji Mori, Kyoto; Shingo Yoshida, Kyoto, all of Japan

[73] Assignee: Matsushita Electric Industrial Co., Ltd., Osaka, Japan

[*] Notice: The portion of the term of this patent subsequent to Apr. 11, 2006 has been disclaimed.

[21] Appl. No.: 298,345

[22] Filed: Jan. 17, 1989

[30] Foreign Application Priority Data

Feb. 21, 1986 [JP] Japan .................... 61-38029

[51] Int. Cl.$^6$ .................................. H01G 9/02
[52] U.S. Cl. .................................. 361/507; 252/62.2
[58] Field of Search ............. 252/62.2; 29/570.1; 361/504–506, 527, 502

[56] References Cited

U.S. PATENT DOCUMENTS

| | | | |
|---|---|---|---|
| 4,117,531 | 9/1978 | Ross et al. | 361/505 |
| 4,377,692 | 3/1983 | Barry et al. | 252/62.2 X |
| 4,715,976 | 12/1987 | Mori et al. | 252/62.2 |
| 4,734,821 | 3/1988 | Morimoto et al. | 361/527 |
| 4,821,153 | 4/1989 | Kuwae et al. | 361/505 |

FOREIGN PATENT DOCUMENTS

| | | | |
|---|---|---|---|
| 33345 | 5/1973 | Japan . | |
| 40025 | 8/1977 | Japan | 361/502 |
| 7564 | 1/1979 | Japan . | |
| 125610 | 7/1984 | Japan . | |
| 232410 | 12/1984 | Japan . | |
| 7617 | 1/1986 | Japan . | |

*Primary Examiner*—Bruce A. Reynolds
*Assistant Examiner*—Michael D. Switzer
*Attorney, Agent, or Firm*—Lowe, Price, LeBlanc & Becker

[57] ABSTRACT

This invention relates to an electrolyte for use in electrolytic capacitors and also to an electrolytic capacitor using the electrolyte. The solute for the electrolyte is a quaternary ammonium salt of either a carboxylic acid selected from the group consisting of phthalic acid, tetrahydrophthalic acid, hexahydrophthalic acid and maleic acid, or an alkyl or nitro-substituted compound of the acid. The electrolytic capacitor has improved low temperature characteristics and an improved variation in characteristics at high temperatures in relation to time with a prolonged life.

74 Claims, 2 Drawing Sheets

ELECTROLYTE FOR ELECTROLYTIC CAPACITORS AND ELECTROLYTIC CAPACITOR USING THE ELECTROLYTE

TECHNICAL FIELD

This invention relates to an electrolyte for use in electrolytic capacitors and also to an electrolytic capacitor using the electrolyte.

TECHNICAL BACKGROUND

A typical electrolyte for electrolytic capacitors which has been hitherto used is an electrolyte of an ionogen dissolved in ethylene glycol. However, this type of electrolyte has a low specific conductance and tends to cause an impedance characteristic to deteriorate. To avoid this, usual practice is to add water to the electrolyte, but such an electrolyte is elevated in vapor pressure at high temperatures and is apt to react with an aluminum electrode, thus being unsuitable for use in a high temperature range.

In order to improve the above drawbacks, there have been proposed an electrolyte using Y-butyrolactone as a solvent and a triethylamine salt of phthalic acid as described in Japanese Laid-open Patent Application No. 61-70711 and an electrolyte an amine salt of maleic acid dissolved in a mixed solvent of Y-butyrolactone and ethylene glycol as described in Japanese Laid-open Patent Application No. 54-7564.

Moreover, Japanese Laid-open Patent Application No. 59-78522 describes electrolytes using quaternary ammonium salts of linear dicarboxylic acids, and Japanese Laid-open Patent Application No. 61-93610 teaches electrolytes using tetralkyl ammonium salts of 1,10-decanedicarboxylic acid or 1,6-decanedicarboxylic acid.

However, the known electrolytes comprising triethylamine salts of phthalic acid or maleic acid dissolved in a Y-butyrolactone solvent are disadvantageous in that the acid dissociation is caused by the proton equilibrium of the triethylamine, so that ions are produced only in small amounts. Thus, a sufficiently high specific conductance cannot be obtained. On the other hand, with electrolytes using the quaternary ammonium salts of linear dicarboxylic acids or the tetraalkyl ammonium salts of 1,10-decanedicarboxylic acid or 1,6-decanedicarboxylic acid, the specific conductance becomes low because of the rather inappropriate combination with the acid. Accordingly, electrolytic capacitors using these electrolytes cannot disadvantageously lower the impedance characteristic.

DISCLOSURE OF THE INVENTION

The present invention contemplates to provide an electrolyte for electrolytic capacitors and an electrolytic capacitor using the electrolyte in which a solute of the electrolyte used is a quaternary ammonium salt of either a carboxylic acid selected from the group consisting of phthalic acid, tetrahydrophthalic acid, hexahydrophthalic acid and maleic acid, or an alkyl or nitro-substituted compound of the acid, whereby the resultant electrolytic capacitor has improved low temperature characteristics and improved characteristics with time at high temperatures, thus ensuring a prolonged life.

BRIEF DESCRIPTION OF THE DRAWINGS

FIGS. 2–4 are, respectively, graphs of characteristics, in relation to time, of aluminum electrolytic capacitors having ratings 10 V and 2200 μF (ø16×32) and using known electrolytes and electrolytes of the invention, in which FIG. 2 is a characteristic graph showing a variation in electrostatic capacity by application of a rated voltage, FIG. 3 is a characteristic graph showing a variation in tangent of the loss angle by application of a rated voltage, and FIG. 4 is a characteristic graph of a variation in leakage current in the absence of an applied voltage.

BEST MODE FOR CARRYING OUT THE INVENTION

Figure 1:
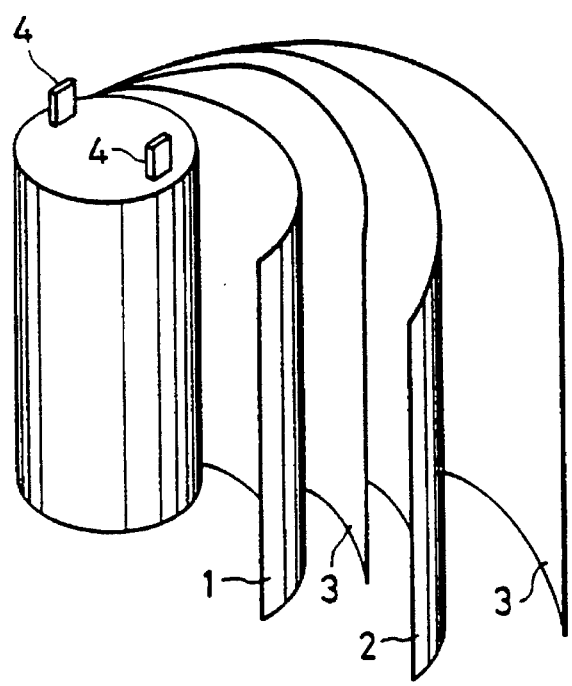
FIG. 1 is a schematic perspective view illustrating the respective members of an electrolytic capacitor.

The present invention provides an electrolyte for use in an electrolytic capacitor which comprises a solution, in an organic solvent, of a quaternary ammonium salt of a carboxylic acid selected from the group consisting of phthalic acid, a tetrahydrophthalic acid, hexahydrophthalic acid and maleic acid, or of an alkyl or nitro-substituted compound of the carboxylic acid, and also provides an electrolytic capacitor using the electrolyte.

The quaternary ammonium salts are those compounds of the following general formula

in which $X_1$ represents

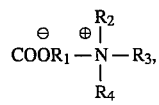

$X_2$ represent

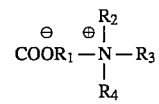

in which each $R_1$, each $R_2$, each $R_3$ and each $R_4$ independently represent an alkyl group, an aryl group, a cycloalkyl group, an aralkyl group and/or a hydroxyalkyl group, or the two of these substituents may combine to form a divalent group which forms a ring along with the nitrogen atom, and A represents a carboxylic acid residue.

In the above general formula, $R_1$, $R_2$, $R_3$ and $R_4$ are, respectively, a $C_{1-12}$ alkyl group (such as methyl, ethyl, propyl, buryl, octyl, dodecyl and the like), an aryl group (such as phenyl and the like), a cycloalkyl group (such as cyclohexyl and the like), an aralkyl group (such as benzyl and the like), and a $C_{2-4}$ hydroxyalkyl group (such as hydroxyethyl and the like). Alternatively, these two substituents may combine to give a divalent group such for example, -$(CH_2)_n$- wherein n is 5 or 6, or -$CH_2CH_2OCH_2CH_2$-, and form a ring along with the nitrogen atom.

In the practice of the invention, the tetrahydrophthalic acid includes cyclohexene-1,2-dicarboxylic acid and cyclohexene-4,5-dicarboxylic acid.

The alkyl-substituted compound of the carbaxylic acid is one whose alkyl moiety has 1–3 carbon atoms, e.g. a methyl-substituted compound. Examples at the alkyl substituted compound include methylmaleic acid (citracanic acid) and dimethylmaleic acid. Examples of the nitro-substituted compounds include 3- ar 4-nitraphthalic acid. These carbaxylic acids and their alkyl or nitro-substituted compounds may be used in combination.

Examples of the quaternary ammonium salts include tetraalkylammonium salts (whose alkyl moiety has generally 1–12 carbon atoms, e.g. a tetramethylammonium salt, a tetraethylammonium salt, a tetrapropylammonium salt, a tetrabutylammonium salt, a methyltriethylammonium salt, an ethyltrimethylammonium salt and the like), aryltrialkylammonium salts (such as a phenyltrimethylammonium salt and the like), cyclohexyltrialkyl ammonium salts (such as a cyclohexyltrimethylammonium salt and the like), arylalkyltrialkyl ammonium salts (such as a benzyltrimethylammonium salt and the like), trialkylhydroxyalkylammonium salts (such as a trimethylhydroxyethylammonium salt and the like), N,N-dialkylpiperidinium salts (such as an N,N-dimethylpiperidinium salt and the like), and mixtures thereof.

Of these quaternary ammonium salts, the tetraalkylammonium salts and the trialkylydroxyalkylammonium salts are preferred. Most preferably, a tetraethylammonium salt is used.

The equivalent ratio between the carboxyl groups of a carboxylic acid and the quaternary ammonium base is generally in the range of 1.2:1.0–2.8:1.0, preferably 1.5:1.0–2.5:1.0, and most preferably 2.0:1.0. In other words, a mono-salt having a molar ratio between the acid and the base of 1:1 is most preferably used.

The electrolyte for an electrolytic capacitor according to the invention comprises the above-defined salt and an organic solvent. Examples of the organic solvent include alcohols, e.g. monohydric alcohols such as butyl alcohol, diacetone alcohol, benzyl alcohol , amino alcohol s and the like, dihydric alcohols such as ethylene glycol, propylene glycol, dithylene glycol, hexylene glycol, phenyl glycol and the like, trihydric alcohols such as glycerins, 3-methylpentane-1,3,5-triol and the like, and hexitol; ethers, e.g. monoethers such as ethylene glycol monomethyl ether, ethylene glycol monoethyl ether, diethylene glycol monomethyl ether, diethylene glycol monoethyl ether, ethylene glycol phenyl ether and the like, diethers such as ethylene glycol dimethyl ether, ethylene glycol diethyl ether, diethylene glycol dimethyl ether, diethylene glycol diethyl ether and the like amides, e.g. formamides such as N-methylformamide, N,N-dimethylformamide, N-ethylformamide, N,N-diethylformamide and the like, aceramides such as N-methylacetamide, N,N-dimethylacetamide, N-ethylacetamide, N,N-diethylacetamide and the like, propionamides such as N,N-dimethylpropionamide and the like, and hexamethylphosphoryl amide; oxazolidinones such as N-methyl-2-oxazolidinone, N-ethyl-2-oxazolidinone, dimethyl-2-oxazolidinone and the like; dimethylsulfoxide, Y-butyrolactone and the like; and mixtures thereof.

Of these, amides, oxazlidinones and Y-butyrolactone are preferred. More preferably, Y-butyrolactone alone or a mixed solvent comprising a major proportion of Y-butyrolactone is used. In the latter case, the content of the Y-butyrolactone is preferably in the range of 50–100% based on the total weight of the solvent.

The electrolyte of the invention may further comprise water, if necessary. The content of water is generally not larger than 10% based on the weight of the electrolyte.

In an electrolyte using Y-butyrolactone alone or a mixed solvent comprised mainly of Y-butyrolactone as a solvent and a tetraethylammonium salt of phthalic acid or maleic acid as a solute, when a mono salt having a molar ratio of the acid and the base of 1:1 is used, a maximum specific conductance is shown. Accordingly, monotetraethylammonium phthalate or monotetraethylammonium maleate is preferred.

The amount of the quaternary ammonium salt in the electrolyte is generally in the range of 1 wt%–40 wt%, preferably 5 wt%–30 wt%. The amount of the organic solvent is in the range of 60 wt%–99 wt%, preferably 70 wt%–95 wt%.

The electrolyte of the invention obtained as described above has a high specific conductance and good stability at high temperatures. The use of the electrolytes results in an electrolytic capacitor which has a low impedance and is stable at high temperatures. More particularly, when a solute which is used in combination with a solvent comprised mainly of Y-butyrolactone is phthalic acid, maleic acid, nitrophthalic acid, hexahydrophthalic acid or citraconic acid, very high conductance is obtained. In Y-butyrolactone, phthalic acid, maleic acid, nitrophthalic acid, tetrahydrophthalic acid, hexahydrophthalic acid, citraconic acid, and tetraethylammonium are very stable at high temperatures. In addition, the reaction between the solute and the solvent and the reaction between phthalic acid, maleic acid, nitrophthalic acid, tetrahydrophthalic acid, hexahydrophthalic acid or citraconic acid and tetraethylammonium do rarely take place. Presumably, this is why the stability at high temperatures is excellent.

In the practice of the invention, the concentration of the quaternary ammonium salt is in the range of 1 wt%–40 wt%. If the amount is less than 1 wt%, the specific conductance does not become satisfactorily high. Over 40 wt%, precipitation will take place.

(Examples)

The present invention is illustrated by way of examples.

In Table 1, there are shown electrolytic compositions according to the invention and for comparison along with their specific conductance at normal temperatures.

As will be clear from Table 1, higher specific conductances can be obtained than the conductances of the known electrolytes.

TABLE 1

Electrolytic Compositions of Invention and for Comparison and Specific Conductances

| | Electrolytic Composition (parts by weight) | | Specific Conductance 30° C. (ms/cm) |
|---|---|---|---|
| Reference 1 | Y-butyrolactone | 75 | 3.7 |
| | monotriethylammonium phthalate | 25 | |
| Reference 2 | Y-butyrolactone | 75 | 6.1 |
| | ethylene glycol | 8 | |
| | monotriethylammonium maleate | 17 | |
| Reference 3 | Y-butyrolactone | 85 | 3.5 |
| | tetraethylammonium adipate | 15 | |
| Reference 4 | ethylene glycol | 75 | 2.2 |
| | water | 5 | |
| | tetraethylammonium 1,6-decanedicarboxylate | 20 | |
| Example 1 | Y-butyrolactone | 75 | 10.9 |
| | monotetraethylammonium phthalate | 25 | |
| Example 2 | Y-butyrolactone | 68 | 9.3 |

TABLE 1-continued

Electrolytic Compositions of Invention and for
Comparison and Specific Conductances

|  | Electrolytic Composition (parts by weight) |  | Specific Conductance 30° C. (ms/cm) |
| --- | --- | --- | --- |
|  | ethylene glycol | 7 |  |
|  | monotetraethylammonium phthalate | 25 |  |
| Example 3 | γ-butyrolactone | 60 | 9.4 |
|  | 3-methyloxazolidine-2-one | 15 |  |
|  | monotetraethylammonium phthalate | 25 |  |
| Example 4 | γ-butyrolactone | 75 | 16.4 |
|  | monotetraethylammonium maleate | 25 |  |
| Example 5 | γ-butyrolactone | 68 | 14.9 |
|  | ethylene glycol | 7 |  |
|  | monotetraethylammonium maleate | 25 |  |
| Example 6 | γ-butyrolactone | 60 | 15.0 |
|  | 3-methyloxazolidine-2-one | 15 |  |
|  | monotetraethylammonium maleate | 25 |  |
| Example 7 | γ-butyrolactone | 75 | 11.5 |
|  | monotetraethylammonium 4-nitrophthalate | 25 |  |
| Example 8 | γ-butyrolactone | 68 | 10.4 |
|  | ethylene glycol | 7 |  |
|  | monotetraethylammonium 4-nitrophthalate | 25 |  |
| Example 9 | γ-butyrolactone | 60 | 10.8 |
|  | 3-methyloxazolidine-2-one | 15 |  |
|  | monotetraethylammonium 4-nitrophthalate | 25 |  |
| Example 10 | γ-butyrolactone | 75 | 9.9 |
|  | monotetraethylammonium 3-nitrophthalate | 25 |  |
| Example 11 | γ-butyrolactone | 75 | 7.0 |
|  | monotetraethylammonium cyclohexene-1,2-dicarboxylate | 25 |  |
| Example 12 | γ-butyrolactone | 68 | 6.2 |
|  | ethylene glycol | 7 |  |
|  | monotetraethylammonium cyclohexene-1,2-dicarboxylate | 25 |  |
| Example 13 | γ-butyrolactone | 60 | 6.6 |
|  | 3-methyloxazolidine-2-one | 15 |  |
|  | monotetraethylammonium cyclohexene-1,2-dicarboxylate | 25 |  |
| Example 14 | γ-butyrolactone | 75 | 8.0 |
|  | monotetraethylammonium cyclohexene-4,5-dicarboxylate | 25 |  |
| Example 15 | γ-butyrolactone | 75 | 13.8 |
|  | monotetraethylammonium citraconate | 25 |  |
| Example 16 | γ-butyrolactone | 68 | 13.2 |
|  | ethylene glycol | 7 |  |
|  | monotetraethylammonium citraconate | 25 |  |
| Example 17 | γ-butyrolactone | 60 | 13.5 |
|  | 3-methyloxazolidine-2-one | 15 |  |
|  | monotetraethylammonium citraconate | 25 |  |

In Table 2, there are shown initial characteristics capacitors using the electrolytes of References 1, 2 and 3 and Examples, 1, 2, 3, 4, 5, 6, 7, 8, 9, 11, 12, 13, 15, 16 and 17 indicated in Table 1. The capacitor used was an aluminum electrolytic capacitor having ratings of V and 220 μF (ø16× 32). FIG. 1 schematically shows an arrangement of the respective parts or members of this type of aluminum electrolytic capacitor. In FIG. 1, an anode foil 1 used as an anode of aluminum and a cathode foil used as a cathode of aluminum are convolutely wound so that they are in face-to-face relation through a separator 3, thereby providing a capacitor element. The anode foil 1 and the cathode foil 2 of the element have leading tabs respectively.

The thus arranged element is impregnated with each electrolyte and is sealingly encased in a case to obtain an electrolytic capacitor.

TABLE 2

Comparison of Initial Characteristics
Average Value of n = 10
Capacitors

|  | Electrostatic Capacity (120 Hz) (μF) | tan d (120 Hz, 20° C.) (%) | Leakage Current (μA) | Impedance (100 KHz, 20° C.) (mΩ) |
| --- | --- | --- | --- | --- |
| Reference 1 | 2160 | 12.3 | 8.0 | 86 |
| Reference 2 | 2170 | 7.4 | 6.9 | 51 |
| Reference 3 | 2170 | 12.8 | 8.5 | 90 |
| Example 1 | 2190 | 5.6 | 5.5 | 29 |
| Example 2 | 2190 | 6.2 | 5.3 | 33 |
| Example 3 | 2190 | 5.9 | 5.9 | 33 |
| Example 4 | 2180 | 4.1 | 6.1 | 17 |
| Example 5 | 2190 | 4.6 | 5.7 | 23 |
| Example 6 | 2180 | 4.4 | 5.8 | 22 |
| Example 7 | 2190 | 5.2 | 6.0 | 24 |
| Example 8 | 2210 | 5.5 | 5.8 | 26 |
| Example 9 | 2200 | 6.0 | 6.1 | 25 |
| Example 11 | 2180 | 7.1 | 5.9 | 45 |
| Example 12 | 2190 | 7.3 | 5.8 | 49 |
| Example 13 | 2170 | 7.1 | 6.2 | 48 |
| Example 15 | 2180 | 4.6 | 6.1 | 24 |
| Example 16 | 2200 | 4.9 | 5.9 | 25 |
| Example 17 | 2190 | 4.4 | 6.3 | 22 | tan δ: tangent of the loss angle

As will be apparent from Table 2, the electrolytes of Examples of the invention have significantly lower tan δ 120Hz) and impedance (100 KHz) characteristics than the known electrolytes.

Figure 2:
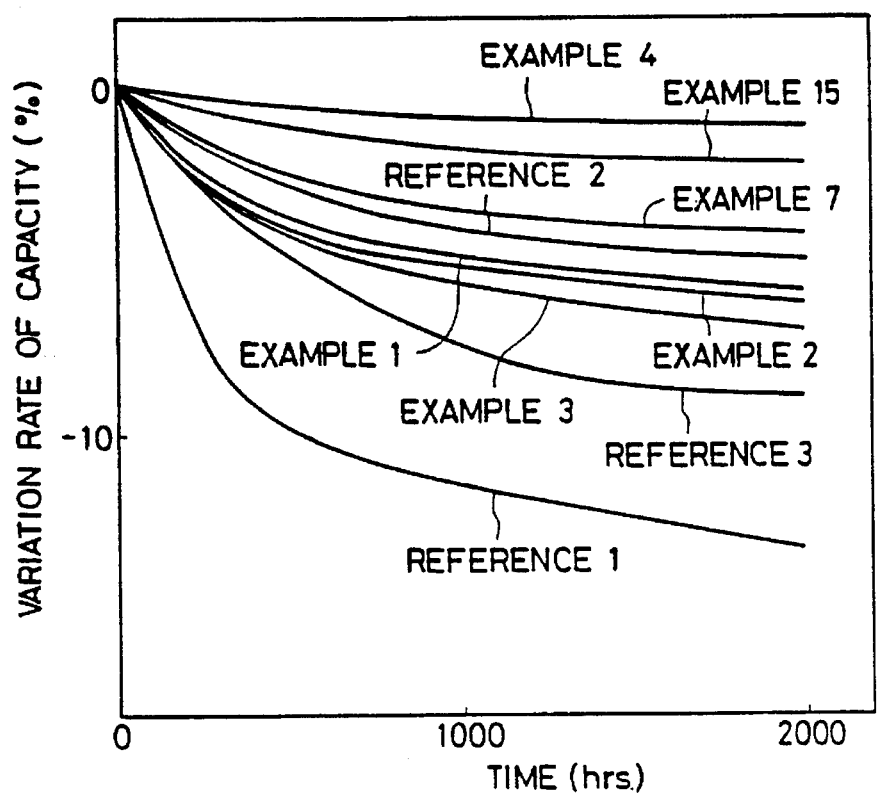
Figure 3:
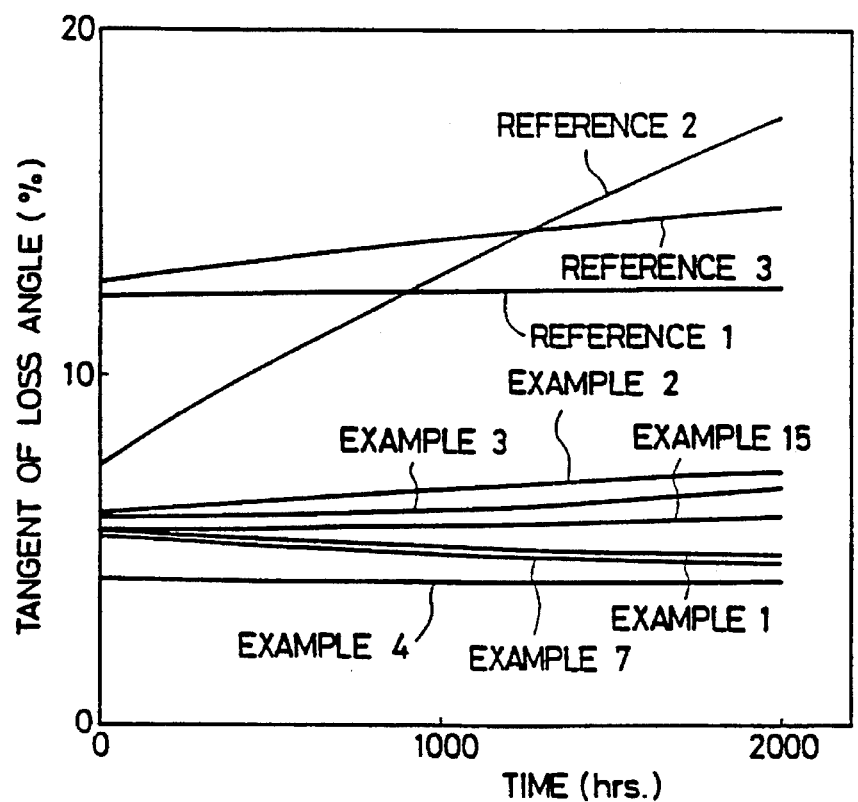
Figure 4:
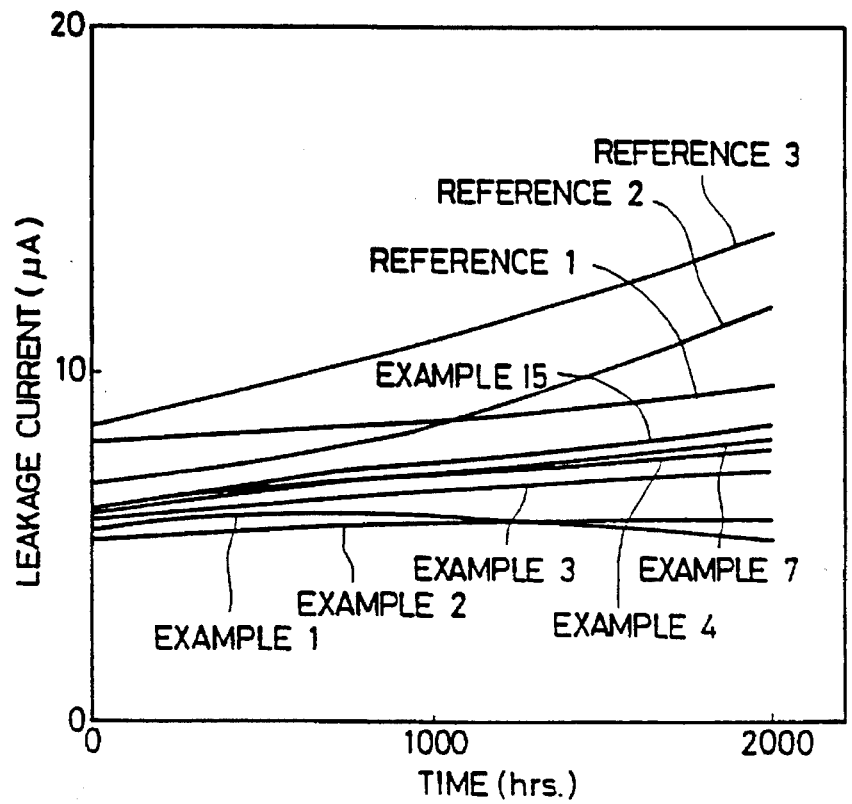

FIGS. 2 to 4 show variations in the respective characteristics at 105° C. of the aluminum electrolytic capacitors using the electrolytes of References 1, 2 and 3 and Examples 1, 2, 3, 4, 7 and 15 in relation to time. More particularly, FIG. 2 shows a variation in electrostatic capacity obtained by application of a rated voltage, FIG. 3 shows a variation in tangent of the loss angle obtained by application of a rated voltage, and FIG. 4 shows a variation in leakage current without application of any voltage.

As will be clear from FIGS. 2–4, the characteristic variations under high temperature conditions are very small and thus, highly reliable capacitors can be obtained.

Industrial Utility

As described hereinbefore, the electrolytes for electrolytic capacitors and capacitors using such electrolytes according to the invention have high specific conductance, and the loss of the capacitor can be improved over a wide range of normal to low temperatures. Because the electrolytes do rarely deteriorate at high temperatures, electrolytic capacitors whose characteristics do not vary over a long term can be obtained.

Thus, the present invention provides an electrolytic capacitor which exhibits stable characteristics over a wide temperature range of from low to high temperatures.

What is claimed is:

1. An electrolytic capacitor comprising a capacitor element and an electrolyte impregnated to the element, wherein the electrolyte comprises an organic polar solvent and a solute dissolved in the solvent, said solute being a quaternary ammonium salt of a carboxylic acid selected from the group consisting of phthalic acid, a tetrahydrophthalic acid, hexahydrophthalic acid, maleic acid, alkyl-substituted derivatives of said acids, and nitro-substituted derivatives of said acids, provided that if the solute is selected from the group consisting of tetraalkylammonium maleates and tetraalkylammonium phthalates, the equivalent ratio between the carboxyl groups of said carboxylic acid and a quaternary ammonium base forming said salt is in the range of 1.2:1.0–2.8:1.0.

2. The electrolytic capacitor according to claim 1, wherein the carboxylic acid is phthalic acid.

3. The electrolytic capacitor according to claim 1, wherein the carboxylic acid is a tetrahydrophthalic acid.

4. The electrolytic capacitor according to claim 3, wherein the quaternary ammonium salt of tetrahydrophthalic acid is an acidic salt.

5. The electrolytic capacitor according to claim 1, wherein the carboxylic acid is maleic acid.

6. The electrolytic capacitor according to claim 1, wherein the solute is present in an amount of from 1 to 50% by weight in the organic polar solvent.

7. The electrolytic capacitor according to claim 1, wherein the quaternary ammonium group is represented by $R_4N^+$ wherein R is an alkyl group having from 1 to 12 carbon atoms.

8. An electrolyte for an electrolytic capacitor comprising an organic solvent solution of a tetraalkylammonium salt of maleic acid or an alkyl or nitro-substituted compound of said acid.

9. An electrolyte for an electrolytic capacitor comprising an organic solvent solution of a trialkylhydroxyalkylammonium salt of tetrahydrophthalic acid or an alkyl or nitro-substituted compound of said acid.

10. The electrolyte according to claim 9, wherein said tetrahydrophthalic acid is cyclohexene-1,2-dicarboxylic acid.

11. The electrolyte according to claim 9, wherein said tetrahydrophthalic acid is cyclohexene-4,5-dicarboxylic acid.

12. An electrolyte for an electrolytic capacitor comprising an organic solvent solution of hexyhydrophthalic acid or an alkyl or nitro-substituted compound of said acid.

13. An electrolyte for an electrolytic capacitor comprising an organic solvent solution of monotrimethylhydroxyethylammonium tetrahydrophthalate.

14. An electrolytic capacitor comprising a capacitor element provided with an anode and a cathode facing one another through a separator, said capacitor element being impregnated with an electrolyte which comprises an organic solvent and a solute which consists essentially of a tetraalkylammonium salt of a carboxylic acid selected from the group consisting of phthalic acid, tetrahydrophthalic acid, hexahydrophthalic acid and maleic acid alkyl and nitro-substituted derivatives of said acids, and combinations of said acids and said alkyl or nitro-substituted derivatives, provided that if the solute is selected from the group consisting of tetraalkylammonium maleates and tetraalkylammonium phthalates, the equivalent ratio between the carboxyl groups of said carboxylic acid and a quaternary ammonium base forming said salt is in the range of 1.2:1.0–2.8:1.0.

15. The electrolytic capacitor according to claim 14, wherein an alkyl moiety in said tetraalkylammonium salt has 1 to 12 carbon atoms.

16. The electrolytic capacitor according to claim 15, wherein said tetraalkylammonium salt is a tetramethylammonium salt.

17. The electrolytic capacitor according to claim 15, wherein said tetraalkylammonium salt is a tetraethylammonium salt.

18. The electrolytic capacitor according to claim 15, wherein said tetraalkylammonium salt is a tetrapropylammonium salt.

19. The electrolytic capacitor according to claim 15, wherein said tetraalkylammonium salt is a tetrabutylammonium salt.

20. The electrolytic capacitor according to claim 15, wherein said tetraalkylammonium salt is an ethyltrimethylammonium salt.

21. The electrolytic capacitor according to claim 14, wherein said carboxylic acid is phthalic acid.

22. The electrolytic capacitor according to claim 14, wherein said carboxylic acid is tetrahydrophthalic acid.

23. The electrolytic capacitor according to claim 22, wherein said tetrahydrophthalic acid is cyclohexene-1,2-dicarboxylic acid.

24. The electrolytic capacitor according to claim 22, wherein said tetrahydrophthalic acid is cyclohexene-4,5-dicarboxylic acid.

25. The electrolytic capacitor according to claim 14, wherein said carboxylic acid is hexahydrophthalic acid.

26. The electrolytic capacitor according to claim 14, wherein said carboxylic acid is maleic acid.

27. The electrolytic capacitor according to claim 14, wherein the alkyl-substituted compound of the carboxylic acid has 1 to 3 carbon atoms in the alkyl moiety.

28. The electrolytic capacitor according to claim 27, wherein said alkyl-substituted compound is methylmaleic acid.

29. The electrolytic capacitor according to claim 27, wherein said alkyl-substituted compound is dimethylmaleic acid.

30. The electrolytic capacitor according to claim 14, wherein the nitro-substituted compound of the carboxylic acid is 3-nitrophthalic acid.

31. The electrolytic capacitor according to claim 14, wherein the nitro-substituted compound of the carboxylic acid is 4-nitrophthalic acid.

32. The electrolytic capacitor according to claim 14, wherein one of said alkyl and nitro-substituted derivatives of the carboxylic acid is used in combination with said carboxylic acid.

33. The electrolytic capacitor according to claim 14, wherein said tetraalkylammonium salt is monotetraethylammonium phthalate or monotetramethylammonium phthalate.

34. The electrolytic capacitor according to claim 14, wherein said tetraalkylammonium salt is monoethyltrimethylammonium phthalate or monomethyltriethylammonium phthalate.

35. The electrolytic capacitor according to claim 14, wherein said tetraalkylammonium salt is monotetraethylammonium maleate or monotetramethylammonium phthalate.

36. The electrolytic capacitor according to claim 14, wherein said tetraalkylammonium salt is monoethyltrimethylammonium maleate or monomethyltriethylammonium maleate.

37. The electrolytic capacitor according to claim 14, wherein said solvent comprises gamma-butyrolactone.

38. The electrolytic capacitor according to claim 37, wherein said solvent consists essentially of gamma-butyrolactone.

39. The electrolytic capacitor according to claim 14, wherein said solvent is an amide.

40. The electrolytic capacitor according to claim 14, wherein said solvent is an oxazolidinone.

41. The electrolytic capacitor according to claim 14, said tetraalkylammonium salt is present in an amount of 1 wt% to 40 wt% based on the electrolyte.

42. The electrolytic capacitor according to claim 41, wherein the amount is in the range of 5 wt% to 30 wt%.

43. The electrolytic capacitor according to claim 14, wherein an equivalent ratio between carboxyl groups in the carboxylic acid or the alkyl or nitro-substituted derivative of the carboxylic acid and the tetraalkylammonium base is in the range of 1.2:1.0 to 2.8:1.0.

44. The electrolytic capacitor according to claim 43, wherein the equivalent ratio is in the range of 2.0:1.0.

45. An electrolytic capacitor comprising a capacitor element provided with an anode and a cathode facing one another through a separator, said capacitor element being impregnated with an electrolyte which comprises an organic solvent and a solute which consists essentially of a trialkylhydroxyalkylammonium salt of a carboxylic acid selected from the group consisting of phthalic acid, tetrahydrophthalic acid, hexahydrophthalic acid, maleic acid, alkyl and nitro-substituted derivatives of said acids, and combinations of said acids and said alkyl or nitro-substituted derivatives.

46. The electrolytic capacitor according to claim 45, wherein said trialkylhydroxyalkylammonium salt is a trimethylhydroxyethylammonium salt.

47. The electrolytic capacitor according to claim 45, wherein said trialkylhydroxyalkylammonium salt is a triethylhydroxyethylammonium salt.

48. The electrolytic capacitor according to claim 45, wherein said carboxylic acid is phthalic acid.

49. The electrolytic capacitor according to claim 45, wherein said carboxylic acid is tetrahydrophthalic acid.

50. The electrolytic capacitor according to claim 49, wherein said tetrahydrophthalic acid is cyclohexene-1,2-dicarboxylic acid.

51. The electrolytic capacitor according to claim 49, wherein said tetrahydrophthalic acid is cyclohexene-4,5-dicarboxylic acid.

52. The electrolytic capacitor according to claim 45, wherein said carboxylic acid is maleic acid.

53. The electrolytic capacitor according to claim 45, wherein the alkyl-substituted compound of the carboxylic acid has 1 to 3 carbon atoms in the alkyl moiety.

54. The electrolytic capacitor according to claim 53, wherein said alkyl-substituted compound is methylmaleic acid.

55. The electrolytic capacitor according to claim 53, wherein said alkyl-substituted compound is dimethylmaleic acid.

56. The electrolytic capacitor according to claim 45, wherein the nitro-substituted compound of the carboxylic acid is 3-nitrophthalic acid.

57. The electrolytic capacitor according to claim 45, wherein the nitro-substituted compound of the carboxylic acid is 4-nitrophthalic acid.

58. The electrolytic capacitor according to claim 45, wherein one of said alkyl and nitro-substituted derivatives of the carboxylic acid is used in combination with said carboxylic acid.

59. The electrolytic capacitor according to claim 45, wherein said trialkylhydroxyalkylammonium salt is a monotrimethylhydroxyethylammonium phthalate.

60. The electrolytic capacitor according to claim 45, wherein said trialkylhydroxyalkylammonium salt is monotrimethylhydroxyethylammonium tetrahydrophthalate.

61. The electrolytic capacitor according to claim 45, wherein said trialkylhydroxyalkylammonium salt is monotrimethylhydroxyethylammonium hexahydrophthalate.

62. The electrolytic capacitor according to claim 45, wherein said trialkylhydroxyalkylammonium salt is a monotrimethylhydroxyethylammonium maleate.

63. The electrolytic capacitor according to claim 45, wherein said solvent comprises gamma-butyrolactone.

64. The electrolytic capacitor according to claim 45, wherein said solvent consists essentially of gamma-butyrolactone.

65. The electrolytic capacitor according to claim 45, wherein said solvent is an amide.

66. The electrolytic capacitor according to claim 45, wherein said solvent is an oxazolidinone.

67. The electrolytic capacitor according to claim 45, said trialkylhydroxyalkylammonium salt is present in an amount of 1 wt% to 40 wt% based on the electrolyte.

68. The electrolytic capacitor according to claim 67, wherein the amount is in the range of 5 wt% to 30 wt%.

69. The electrolytic capacitor according to claim 45, wherein an equivalent ratio between carboxyl groups in the carboxylic acid or the alkyl or nitro-substituted derivative of the carboxylic acid and the trialkylhydroxyalkylammonium base is in the range of 1.2:1.0 to 2.8:1.0.

70. The electrolytic capacitor according to claim 69, wherein the equivalent ratio is in the range of 2.0:1.0.

71. An electrolyte for an electrolytic capacitor comprising an organic solvent solution of a tetraalkylammonium salt of tetrahydrophthalic acid or an alkyl or nitro-substituted compound of said acid.

72. The electrolyte according to claim 71, wherein said tetrahydrophthalic acid is cyclohexene-1,2-dicarboxylic acid.

73. The electrolyte according to claim 71, wherein said tetrahydrophthalic acid is cyclohexene-4,5-dicarboxylic acid.

74. An electrolyte for an electrolytic capacitor comprising an organic solvent solution of monotrimethylhydroxyethylammonium hexahydrophthalate.

\* \* \* \* \*

UNITED STATES PATENT AND TRADEMARK OFFICE
CERTIFICATE OF CORRECTION

PATENT NO. : 5,457,599  Page 1 of 2
DATED : October 10, 1995
INVENTOR(S) : Yoshiteru Kuwae, et al It is certified that error appears in the above-indentified patent and that said Letters Patent is hereby corrected as shown below:

On the title page, item [73] should read as follows:

--[73] Assignee: Matsushita Electric Industrial Co., Ltd., Osaka, Japan; Sanyo Chemical Industries, Ltd., Kyoto, Japan--

Column 1, line 21, change "Y" to --$\gamma$--;

Column 1, line 26, change "Y" to --$\gamma$--;

Column 1, line 37, change "Y" to --$\gamma$--.

Column 3, line 55, change "Y" to --$\gamma$--;

Column 3, line 56, change "Y" to --$\gamma$--;

Column 3, line 57, change "Y" to --$\gamma$--;

UNITED STATES PATENT AND TRADEMARK OFFICE
CERTIFICATE OF CORRECTION

PATENT NO. : 5,457,599
DATED : October 10, 1995
INVENTOR(S) : Yoshiteru Kuwae, et al It is certified that error appears in the above-indentified patent and that said Letters Patent is hereby corrected as shown below:

Column 3, line 58, change "Y" to --γ--;
Column 3, line 65, change "Y" to --γ--;
Column 3, line 66, change "Y" to --γ--.
Column 4, line 17, change "Y" to --γ--;
Column 4, line 19, change "Y" to --γ--.

Signed and Sealed this

Twenty-third Day of July, 1996

BRUCE LEHMAN

*Attest:*

*Attesting Officer*  *Commissioner of Patents and Trademarks*